United States Patent [19]

Kondo

[11] 3,993,847

[45] Nov. 23, 1976

[54] SILICA IN ADHESIVE

[75] Inventor: Eiji Kondo, Toba Akashi, Japan

[73] Assignee: Honny Chemicals Company, Ltd., Kobe, Japan

[22] Filed: Aug. 26, 1975

[21] Appl. No.: 607,944

[30] Foreign Application Priority Data

Sept. 14, 1974 Japan............................ 49-106503
Sept. 14, 1974 Japan............................ 49-106504

[52] U.S. Cl............................. 428/451; 156/110 A; 156/124; 156/331; 156/334; 428/462; 428/469; 428/519; 428/521; 428/539
[51] Int. Cl.²...................... B32B 15/06; B32B 25/02
[58] Field of Search............ 428/462, 469, 539, 461, 428/463, 519, 521, 446, 451, 495; 156/110 A, 124, 331, 334

[56] References Cited
UNITED STATES PATENTS

| | | | |
|---|---|---|---|
| 3,514,370 | 5/1970 | Canevari | 428/462 |
| 3,857,726 | 12/1974 | Van Gils | 428/462 |
| 3,897,583 | 7/1975 | Bellamy | 428/462 X |

*Primary Examiner*—Harold Ansher
*Attorney, Agent, or Firm*—Stevens, Davis, Miller & Mosher

[57] ABSTRACT

The bond strength of composite articles of rubber adhered to ferrous metal substrates through an adhesive is substantially improved at ambient and elevated temperatures by using as the adhesive an interpolymer comprising a conjugated diene and a heterocyclic nitrogen base and containing about 5–180 parts of silica filler per 100 parts by weight of interpolymer. Further improvement is achieved by using a rubber containing about 0.025 to about 1.0 parts by weight of a cobalt compound, calculated as cobalt metal, per 100 parts of rubber.

28 Claims, No Drawings

SILICA IN ADHESIVE

This invention relates to a process for the bonding of rubber to ferrous metal substrates and to novel composite structures obtained by that process.

The vulcanization or the adhesion of rubber to metals has here-to-fore been accomplished by various processes. These include brass, bronze and zinc plating; the use of halogenated natural or synthetic rubbers with and without special adhesion promoting additives such as di-C-nitroso compounds or cobalt naphthenate, etc; isocyanates or isocyanate rubber blends; and synthetic resins of the phenol formaldehyde type. Each suffers from certain obvious weaknesses.

When a metal such as steel is plated with, e.g., brass and then contacted with a compounded vulcanizable rubber and the whole assembly heated under pressure, a strong bond is formed between the brass and rubber presumably due to covalent copper - sulfur - rubber linkages. This bond has good water and solvent resistance. The weaknesses of this approach lie in the process. The brass plating process is expensive and difficult to control. Any variations in the brass composition and crystal structure thereof can result in very poor adhesion to rubber. The use of brass puts severe restraints on the rubber formulator for the rubber stock must be carefully formulated in order to get the optimum adhesion to brass. Bronze plating and Zinc plating suffer from similar problems and limitations.

Chlorinated and brominated natural and synthetic rubbers, particularly when formulated to include cross-linking and adhesion promoting additives such as di-C-nitrosated aromatics give good adhesive bonds between various metals and natural and synthetic rubbers. Because of their somewhat polar nature, they are able to adhere to metals without covalent bonding with the metal surface. This lack of a chemical bond to the metal surface is obviously a disadvantage for the adhesive strength of such systems falls rapidly with increasing temperature.

Polyfunctional isocyanates such as P, P', P'' triisocyanato triphenyl methane by themselves and as additives to rubber solutions have been known for many years to provide high bond strength between rubber and metals. While the mechanism of adhesion is not clearly understood, it is postulated that the isocyanates can chemically react with both the rubber and the metal surface. In the former case, active hydrogens, e.g., hydroxy or carboxyl groups generated by oxidation during rubber processing provide a reaction site for the formation of urethane and other linkages. In the bonding to the metal surface it has been suggested that oxide surfaces which frequently contain some hydroxy groups could react with the isocyanate group. In any event the solvent resistance and rate of reduction of bond strength with increasing temperature of isocyanate bonded rubber to metal parts is better than would be expected if the adhesion to metal were due only to physical forces. The disadvantages of isocyanate based systems include high moisture sensitivity and very short pot life due to the highly reactive isocyanate groups and the poor thermal aging characteristics of this bond.

Synthetic resins of the phenol-formaldehyde type, usually blended with a rubbery polymer latex also can be used to bond rubber to metal. This sort of adhesive can chemically combine with an unsaturated rubber either by a migration of sulfur and accelerators from the rubber into the adhesive layer followed by a covulcanization or possibly by reaction of the methylol groups of the resole with the rubber itself. However the adhesion to the metal surface is physical in nature, i.e. Van der Waal type forces and the bond strengths to metal are generally poor, especially at elevated temperatures.

In U.S. Pat. No. 2,978,377 it is mentioned that copolymers of butadiene and a vinyl pyridine such as 2-methyl-5-vinyl pyridine have been used for bonding rubber to metal and that when used with natural rubber or a GRS (1,3 butadiene-styrene) composition an excellent bond is obtained. No mention is made of the strength of such bonds at elevated temperatures and no data are given. In any event, it has been found that there are many natural rubber and GRS compositions that if bonded to metals with copolymers of vinyl pyridines and butadiene result in very poor bond strengths even at normal ambient temperature.

The prior art, as in U.S. Pat. No. 2,885,381, teaches that both carbon black and silica are effective for reinforcing conjugated diene heterocyclic nitrogen base polymers. While that patent is not concerned with adhesion to metal but merely a composition of matter, i.e., rubbery conjugated diene/heterocyclic nitrogen base copolymers reinforced with mineral pigments, it is reasonable to expect that this same approximate equivalency of reinforcing action would likewise apply if either silica or carbon black were used as a filler in conjugated diene heterocyclic nitrogen base copolymer adhesives.

It has also recently been proposed and described in copending application Ser. No. 587,982 filed June 18, 1975 to improve the bonding of rubber to ferrous metal substrates by incorporating silica into the rubber to be bonded by means of an adhesive comprising an interpolymer of a conjugated diene and a heterocyclic nitrogen base. The present process allows the rubber formulator more freedom in rubber compounding since the preferred carbon filler may be used instead of silica in the rubber compounding and in larger quantities while still obtaining the improved adhesion.

The use of certain transition metal salts or soaps such as cobalt naphthenate, copper naphthenate, cobalt resinate etc. as additives to compounded rubbers to improve the adhesion to brass is well known art. However, when compounded rubbers are bonded to brass, bronze or zinc plated surfaces, an essential component of such bond formation is the reaction of the sulfur present in the rubber with both the rubber and the plated metal, presumably to form covalent rubber - sulfur - metal linkages. This involves a totally different bonding mechanism than the present invention where brass or zinc plating is not used. Therefore any prior conclusion that bond strengths would be improved by the addition of such transition metal compounds to the rubbers to be bonded is not possible.

The purpose of the present invention is to bond compounded vulcanizable rubbers to ferrous metals, especially iron and steel, without the use of an intermediate layer of brass, bronze or zinc and thereby eliminate the expense, quality control problems, etc. associated with the use of such metal coatings.

Another object of the present invention is to bond rubber to ferrous metal, especially steel bead wire and cord for use in steel reinforced tires, belts and hoses by using as the adhesive, rubbery copolymers and interpolymers of conjugated dienes and heterocyclic nitrogen bases and without the presently used intermediate layer of brass, bronze or zinc on the wire or cord surface.

Still another object of this invention is to provide a bond between the steel wire or cord and the surrounding rubber that will retain a large meaasure of its bond strength at the elevated temperatures often encountered during the use of the aforementioned tires, belts etc.

It has now been found that if high purity finely divided silica is added to rubbery interpolymers of conjugated dienes and heterocyclic nitrogen bases and particularly interpolymers of conjugated dienes and vinyl pyridines and these compositions are used to bond compounded natural and synthetic rubbers to ferrous substrates, e.g. iron or steel, that the bond strengths, particularly at elevated temperatures, are greatly improved. In addition, it has been discovered that when the rubber stock is blended, with cobalt compound, the adhesion is promoted surprisingly. As will be seen by examining the examples hereinafter unexpectedly other normally reinforcing fillers such as carbon black have no such effect on the bond strengths when added to these interpolymers. Moreover, the silica is effective both in aqueous and organic solvent based adhesive systems while the carbon blacks are totally ineffective regardless of the dispersing media.

Since the prior art teaches that both carbon black and silica are effective for reinforcing conjugated diene-heterocyclic nitrogen copolymers, the present invention must involve some other phenomenon not well understood at present.

The rubbery interpolymers used as the adhesive in the present invention may be copolymers of a conjugated diene with a heterocyclic nitrogen base or interpolymers of the above with at least one additional copolymerizable monomer. Those polymers applicable in the present invention are comprised of about 40–99% by weight of the conjugated diene, about 1–20% by weight of a heterocyclic nitrogen base with 5–15% being preferred and 0 to about 40% by weight of at least one additional copolymerizable monomer.

Within these limits the compositions of the copolymers can be varied widely without sacrificing the excellent hot bond strengths achieved with this invention. Commercially, due to the expense of, e.g. vinyl pyridines, copolymers with relatively low levels of copolymerizable heterocyclic nitrogen base are preferred and amounts as low as 1% have been found to be effective.

These copolymers can be prepared by any method known in the art such as thermal, solution, suspension, mass, and emulsion polymerization. The copolymerization can be free radical or anionic, random, block or stereospecific. The preferred method is by emulsion polymerization.

The conjugated dienes useful in this invention are preferably those which contain four to six, inclusive, carbon atoms per molecule but those containing more carbon atoms per molecule, e.g., eight can also be used. These compounds include hydrocarbons such as 1,3 butadiene, isoprene, piperylene, methyl pentadiene, 2,3 dimethyl-1,3-butadiene, 2,3-diethyl-1,3-butadiene, halohydrocarbons such as haloprenes, e.g. chloroprene, methyl chloroprene and others; and alkoxy hydrocarbons such as methoxy and ethoxy derivatives of the above conjugated dienes e.g. 2 methoxybutadiene and 3-ethoxy-1,3-butadiene.

The polymerizable heterocyclic nitrogen bases which are applicable in this invention are those of the pyridine, quinoline, and isoquinoline series which are copolymerizable with a conjugated diene and contain one and only one $CH_2=C<$ substituent and preferably the group is

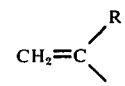

where R is either a hydrogen or a methyl group. That is, the substituent is either a vinyl or an alphamethylvinyl (isopropenyl) group. Of these compounds, the pyridine derivatives are preferred. Various substituted derivatives are also applicable but the total number of carbon atoms in the nuclear substituted groups, such as alkyl groups, should not be greater than 15 because the polymerization rate decreases somewhat with increasing size of the alkyl group. Compounds where the alkyl substituents are methyl and/or ethyl are available commercially and are preferred in this invention.

These heterocyclic nitrogen bases have the formula

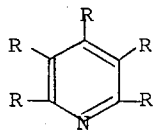 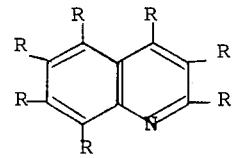 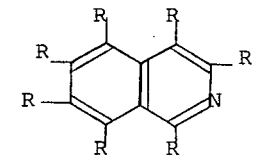

or where R is selected from the group consisting of hydrogen, alkyl vinyl, alpha-methylvinyl, alkoxy, halo, hydroxy, cyano, aryloxy, aryl and combinations of these groups such as halo-alkyl, alkylaryl, hydroxyaryl, and the like, one and only one of said groups being of the type $CH_2=C<$ and preferably being a vinyl or alpha-methyl vinyl group; and the total number of carbon atoms in the nuclear substituted groups being not greater than 15. As has been indicated, the preferred compounds are those wherein the R groups, other than the vinyl or alphamethylvinyl group, are hydrogen or alkyl of 1 to 4 carbon atoms. Examples of such compounds are 2-vinyl pyridine; 2-vinyl-5-ethylpyridine; 2-methyl-5-vinylpyridine; 4-vinyl pyridine; 2,3,4-trimethyl-5-vinylpyridine; 3,4,5,6 tetramethyl-2-vinylpyridine; 3-ethyl-5-vinylpyridine; 2,6-diethyl-4-vinyl-pyridine; 2-isopropyl-4-nonyl-5-vinylpyridine; 2-methyl-5-undecyl-3-vinylpyridine; 2-decyl-5-(alpha-methyl-vinyl)pyridine; 2-vinyl-3-methyl-5-ethyl-pyridine; 2-methoxy-4-chloro-6-vinyl-pyridine; 3-vinyl-5-ethoxypyridine; 2-vinyl-4,5-dibromopyridine; 2-vinyl-4-chloro-5-bromopyridine; 2(alpha-methylvinyl)-4-hydroxy-6-cyanopyridine; 2-vinyl-4-phenoxy-5-methyl-pyridine; 2-cyano-5-(alpha-methylvinyl)pyridine; 3-vinyl-5-phenyl pyridine; 2-paramethylphenyl)-3-vinyl- 4-methylpyridine; 3-vinyl-5-(hydroxyphenyl)-pyridine; 2-vinylquinoline; 2-vinyl-4-ethylquinoline; 3-vinyl-6,7-di-n-propyl quinoline; 2-methyl-4-nonyl-6-vinylquinoline; 4(alpha-methylvinyl)-8-dodecyl quinoline; 3-vinylisoquinoline; 1,6-dimethyl-3-vinylisoquinoline; 2-vinyl-4-benzyl-quinoline; 3-vinyl-5-chloroethyl-quinoline; 3-vinyl-5,6-dichloroisoquinoline; 2-vinyl-6-ethoxy-7-methylquinoline; 3-vinyl-6-hydroxymethylisoquinoline; and the like.

Interpolymers can be prepared from a mixture of two of the previously mentioned conjugated dienes and a hetrocyclic nitrogen base or from a conjugated diene and two different hetrocyclic nitrogen bases. It is, however, more common to prepare interpolymers from a single conjugated diene, a single hetrocyclic nitrogen base and at least one other polymerizable monomer. The latter monomers comprise organic compounds containing at least one polymerizable ethylenic group of the type $>C=C<$. These compounds are well known in the art and include, for example, the alkenes, alkadienes, and the styrenes, such as, ethylene, propylene, 1-butylene, 2-butylene, isobutylene, 1-octene, 1,4-pentadiene, 1,6-hexadiene, 1,7-octadiene, vinyltoluene, vinylxylene, ethylvinylbenzene, vinylcumene, 1,5-cyclooctadiene, cyclohexene, cyclooctene, benzylstyrene, chlorostyrene, bromostyrene, fluorostyrene, trifluoromethylstyrene, iodostyrene, cyanostyrene, nitrostyrene, N,N-dimethylaminostyrene, 3-phenyl-3-butene-1-ol, p-methoxystyrene, vinyl naphthalene, acetoxystyrene, methyl 4-vinylbenzoate, phenoxystyrene, p-vinylphenyl ethyl ether, and the like; the acrylic and substituted acrylic monomers such as methyl acrylate, ethyl acrylate, methyl methacrylate, methacrylic anhydride, acrylic anhydride, cyclohexyl methacrylate, benzyl methacrylate, isopropyl methacrylate, octyl methacrylate, acrylonitrile, methacrylonitrile, methyl alpha-chloroacrylate, ethyl alphaethoxy-acrylate, methyl alpha-acetamidoacrylate, butyl acrylate, ethyl alpha-cyanoacrylate, 2-ethylhexyl acrylate, phenyl acrylate, phenyl methacrylate, alpha-chloroacrylonitrile, ethyl methacrylate, butyl methacrylate, methyl ethacrylate, methacrylamide, N,N-dimethyl-acrylamide, N,N-dibenzylacrylamide, N-butylacrylamide, methacrylyl formamide, and the like; the vinyl esters, vinyl halides, vinyl ethers, vinyl ketones, etc. such as vinyl acetate, vinyl chloroacetate, vinyl butyrate, isopropenyl acetate, vinyl formate, vinyl acrylate, vinyl methacrylate, vinyl methoxy acetate, vinyl benzoate, vinyl iodide, vinyl chloride, vinyl bromide, vinyl fluoride, vinylidene chloride, vinylidene cyanide, vinylidene bromide, 1-chloro-1-fluoroethylene, vinylidene fluoride, vinyl methyl ether, vinyl ethyl ether, vinyl propyl ethers, vinyl butyl ethers, vinyl 2- ethylhexyl ether, vinyl phenyl ether, vinyl 2-methoxyethyl ether, vinyl 2-butoxyethyl ether, 3,4-dihydro-1,2-pyran, 2-butoxy-2'-vinyloxy diethyl ether, vinyl 2-ethylmercaptoethyl ether, vinyl methyl ketone, vinyl ethyl ketone, vinyl phenyl ketone, vinyl ethyl sulfide, vinyl ethyl sulfone, N-vinyloxazolidinone, N-methyl-N-vinyl acetamide, N-vinylpyrrolidone, vinyl imidazole, divinyl sulfide, divinyl sulfoxide, divinyl sulfone, sodium vinyl sulfonate, methyl vinyl sulfonate, N-vinyl pyrrole, and the like; dimethyl fumarate, vinyl isocyanate, tetrafluoroethylene, chlorotrifluoroethylene, nitroethylene, vinyl furane, vinyl carbazole, vinyl acetylene, and the like.

The function of the additional monomer can be merely that of cost reduction with little or no influence on the bond strength and other properties of the adhesive or it may be incorporated to modify a specific property of the adhesive. An example of this would be the incorporation of monomers such as nitriles, esters, amides, etc. that would increase the polarity of the adhesive to make it more compatible with rubbers of higher polarity. Such modifications can easily be made by those skilled in the art and are considered to lie within the scope of this invention.

The high purity finely divided silicas useful in the practice of this invention include all finely divided silicas with a $SiO_2$ content of 95% or more on an anhydrous weight basis, such as Hi-Sil 233 (PPG Industries), Syloid 65, 83, 85, 244 and 255 (Fuji-Davison), Syloid Al-1, 72, 73, 75, 161, 162, 308, 404, 978 (Davison Chemical) Silnex NP-8 (Mizusawa Kagaku), Cab-O-Sil (G. L. Cabot Corp.), Fransil 251 (Fransol), Aerosil TT 600, S, O, ALO111/200, 2491 (Degussa), Aerosil 130, 200, 300, 380, 0, OX50, MOX170, R972 (Nippon Aerosil KK).

These finely divided silicas may be added as a dry powder to either a solution of the interpolymer in a suitable solvent (e.g., THF, toluene, etc.) when a solvent based adhesive is desired or slurried in water and added to an aqueous copolymer latex.

The aqueous silica sols such as Snow Tex 20, 30, C, N and O (Nissan Kagaku); Ludox HS, IS, SM and AM (Du Pont); Syton DS, P, W-200 and 200 (Monsanto); and Nalcoag 1030, 1034, 1035 and 1050 (Nalco) can also be used and, in fact, are often preferred in the practice of this invention because of their ease of dispersion and stability in the conjugated diene-vinyl pyridine copolymer latices.

Silica particle size irrespective of whether the silica is added as a powder or as a stable water dispersed sol is generally in the range of 3 to 60 mu, although smaller or larger particle size silicas can also be employed.

The effective range of the added silica for promoting bond strength is from 5 to 180 parts of silica per 100 parts of copolymer resin solids and the preferred range is from 20 to 100 parts per 100 parts of copolymer resin solids.

When added to the rubber compound to be bonded it is usually preferable to use the compounds of cobalt with organic carboxylic acids, for example, the linoleates, stearates, oleates, acetates, resinates, naphthenates etc., but the salts of inorganic acids such as hydrochloric acid and nitric acid can also be employed. The addition is carried out with the usual processing methods on a mill or in an internal mixer.

The amounts of the cobalt compounds used in the rubber are such that there is from about 0.025 to about 1.0 parts by weight and preferably from 0.05 to 0.5 parts by weight of the metal per 100 parts of the respective rubbery polymer.

In addition to the silica other additives may also be incorporated into the copolymer adhesives prior to their application to the metal surface. One or more other fillers, plasticizers, curatives, and antioxidants may be added to modify some particular property of the copolymer adhesives such as tack, hardness, resistance to oxidation, cure rate etc. Such modifications, as long as they still include silica and conjugated diene, heterocyclic nitrogen base interpolymer are considered to lie within the scope of this invention.

The compounded rubbers that may be bonded by the aforementioned interpolymers include natural and synthetic rubbers and their blends having a fairly high degree of unsaturation, i.e. having a minimum of about 70 mole per cent polymerized conjugated diene. Examples of suitable synthetic rubbers are polybutadiene, polyisoprene, copolymers of butadiene with styrene or acrylonitrile, polychloroprene etc.

These rubbers are conventionally compounded with one or more fillers, plasticizers, curatives and antioxidants. The total amount of filler used is generally in the range of 25 to 150 parts by weight per 100 parts by weight of rubber. Fillers include the various silicas, clays, calcium carbonate; calcium silicate, titanium dioxide and carbon black. In preparing compounded stocks to be employed in the fabrication of tires, it is generally preferred that at least a portion of the filler be carbon black. The plasticizers are generally used in amounts ranging from 1.0 to 100 parts by weight of plasticizer per 100 parts by weight of rubber. The amount of plasticizer actually used will depend upon the softening effect desired. Examples of suitable plasticizers include aromatic extract oils, petroleum softeners including asphaltenes, saturated and unsaturated hydrocarbons, and nitrogen bases, coal tar products, cumarone-indene resins, and esters such as dibutyl phthalate, and tricresyl phosphate. It is to be understood that mixtures of these plasticizers can be employed. The curatives used in the curing system include a vulcanizing agent, and generally one or more vulcanization accelerators together with one or more accelerator activators. The amount of these materials used in the system generally falls in the following ranges: 0.5 to 5.0 parts by weight of the vulcanizing agent, 0.5 to 3.0 parts by weight of the accelerator, 0.5 to 20.0 parts by weight of the accelerator activator, all ranges being based on 100 parts by weight of rubber. Examples of suitable vulcanizing agents are sulfur, sulfur-liberating agents, such as thiuram disulfide, a thiuram polysulfide, or an alkylphenolsulfide, or a peroxide, such as dicumyl peroxide, or dibenzoyl peroxide. When peroxide compounds are used as vulcanizing agents, the accelerator and the accelerator activator are frequently unnecessary. Vulcanization accelerators which can be used include dithiocarbamates, thiuram sulfides, and mercaptobenzothiazoles. Examples of specific compounds which are suitable vulcanization accelerators include zinc diethyl-dithiocarbamate. N,N-di-methyl-S-tert-butylsulfenyldithiocarbamate, tetramethylthiuram disulfide, 2,2'-dibenzothiazyl disulfide, butyraldehydeaniline, mercaptobenzothiazole, N-oxydiethylene-2-benzothiazole sulfenamide, and N-cyclohexy-2-benzothiazole sulfenamide. Materials used in the compounding which function as an accelerator activator include metal oxides such as zinc oxide, magnesium oxide and litharge, which are used in conjunction with acidic materials such as fatty acid, for examples, stearic acid, oleic acid, myristic acid, and the like. Rosin acids can also be employed as the acidic material. An antioxidant is usually included in the compounding recipe in an amount ranging, for example, from 0.5 to 3.0 parts by weight per 100 parts by weight of rubber. Examples of suitable antioxidants include phenyl-$\beta$-naphthylamine, di-tert-butylhydroquinone, 2,2,4-trimethyl-6-phenyl-1,2-dihydroquinoline, a physical mixture of a complex diaryl-amineketone reaction product and N,N'-diphenyl-p-phenylene diamine, and the like. It is to be understood that it is not intended to limit the invention to any particular compounding recipe for the invention is broadly applicable to the use of silica containing conjugated diene, heterocyclic nitrogen base copolymer adhesives to bond a wide range of compounded rubber formulations to iron or steel surfaces.

The adhesives of this invention exhibit useful adhesion on ferrous (steel and iron) surfaces that have been degreased and freed of any weakly adherent oxide coatings by acid etching.

The adhesive is coated on the ferrous surface by any of the usual methods such as dipping, brushing, spraying etc and then dried briefly at room temperature or by the application of heat to remove solvents and/or water. The compounded rubber stock is then contacted with the adhesive surface and the whole assembly vulcanized with heat and pressure to complete the bonding process.

The invention will be better understood by reference to the following illustrative examples:

EXAMPLE 1

Steel bead wires ($d = 0.96$ mm) were solvent degreased and cleaned by dipping briefly in hot concentrated hydrochloric acid, rinsed with water, and then dipped into an adhesive composition consisting of a mixture of 1) a butadiene, 2-vinylpyridine copolymer latex (composition 90:10, 12% resin solids) and 2) a 20% solids aqueous dispersion of silica (Syloid 244, particle size 3–4 m$\mu$. The coated wires were dried at 170° C for 60 seconds and then vulcanized in an H-test mold at 135° C for 60 minutes under 60 Kg/cm$^2$ pressure with the following compounded rubber formulation. The ratio of silica to copolymer on a dry weight basis in the adhesive was 30/100.

| Formulation A | |
|---|---|
| Natural Rubber No. 1 (Smoked Sheet) | 100 |
| HAF Black | 50 |
| Zinc Oxide | 8 |
| Stearic Acid | 1 |
| Pine Tar | 3 |
| Sulfur | 1 |
| Phenyl $\beta$-Naphthylamine | 1 |
| 2-Mercapto benzothiazole | 1.5 |

The samples were aged 24 hours after vulcanization and then heated to and tested at 120° C. (Test rate = 200mm/min.) The bond strength was 30 Kg/2cm.

The H-Test employed in this and the other examples is conducted by vulcanizing the coated wire into the center of two blocks of rubber each having a width and length of 2 cm and a thickness of 1 cm. The two blocks are separated by a distance of 2.5 cm and the wire is embedded 2 cm into each block, the total wire length being 6.5 cm. The blocks are pulled apart at 2 cm per minute parallel to the wire axis till the wire pulls out of one block.

CONTROL EXAMPLE 1

Example 1 was repeated except the silica was omitted from the adhesive. The bond strength at 120° C was 5 Kg/2cm.

EXAMPLE 2

Steel bead wires ($d = 0.96$ mm) were solvent degreased and cleaned as in Example 1, then dipped into an adhesive composition consisting of a mixture of (1) a butadiene-2-vinyl-pyridine copolymer latex (12% resin solids) and (2) a 20% solids aqueous dispersion of silica (Syloid 244). The ratio of silica to copolymer on a dry weight basis in the adhesive was 48/100.

The same experimental series was repeated for a control with the adhesive without silica.

The coated wires were dried at 170° C for 30 sec. and then vulcanized in an H-Test mold at 135° C for 60 minutes under 60 Kg/cm² pressure with the compounded rubber formulation A.

The results of the H-Tests vrs. composition of the copolymers are shown in the following table.

Table 1

|  | control | 1 | 2 | 3 | 4 | 5 | control |
|---|---|---|---|---|---|---|---|
| butadiene (wt %) | 100 | 99 | 95 | 90 | 85 | 80 | 70 |
| 2-vinylpyridine (wt %) | 0 | 1 | 5 | 10 | 15 | 20 | 30 |
| H-Test results (Kg/2cm) at 120° C |  |  |  |  |  |  |  |
| with added silica | 9 | 14 | 30 | 37 | 38 | 12 | 6 |
| without silica | 10 | 8 | 8 | 6 | 8 | 8 | 5 |

CONTROL EXAMPLE

To further demonstrate the uniqueness of the silica-butadiene, vinylpyridine copolymer combination, attempts were made to bond rubber formulation A to steel using a natural rubber latex and a styrene butadiene latex with and without the added silica (30 parts SiO₂/100 parts of latex solids).

SBR latex: composition ratio styrene/butadiene-25/75, 12% solids
Natural Rubber latex: 12% solids,
The results are shown in the following table.

Table 2

| latex composition | SBR | SBR + Syloid 244 | Natural rubber | Natural rubber + Syloid 244 |
|---|---|---|---|---|
| H-test results Kg/2cm at 120° C | <5 | <5 | <5 | <5 |

EXAMPLE 3

Steel bead wires (d = 0.96 mm) were solvent degreased and cleaned as in Example 1 and then dipped into an adhesive composition consisting of a mixture of 1) a butadiene, 2-vinyl-pyridine copolymer latex (composition 90:10, 12% resin solid) and 2) a 20% solids aqueous dispersion of silica (Syloid 244). The coated wires were dried at 170° C for 60 seconds and then vulcanized in an H-test mold at 135° C for 60 minutes under 60 Kg/cm² pressure with the compounded rubber formulation A of Example 1. The adhesion strength was evaluated while varying the silica contents in the adhesive.

Table 3

|  | Control | 1 | 2 | 3 | 4 | 5 | 6 |
|---|---|---|---|---|---|---|---|
| parts SiO₂/100 parts of copolymer | 0 | 5 | 30 | 60 | 80 | 120 | 150 |
| H-test results (Kg/2cm) at 120° C | 5 | 10 | 30 | 33 | 38 | 38 | 22 |

EXAMPLE 4

Example 3(4) was repeated except that a butadiene, 2-methyl-5-vinyl pyridine copolymer latex (composition 90:10, 12% resin solids) was substituted for the butadiene, 2-vinyl pyridine copolymer latex.

Table 4

|  | Control | Example |
|---|---|---|
| Parts SiO₂/100 parts of copolymer | 0 | 80 |
| H-Test Kg/2cm) at 120° C | 5 | 29 |

EXAMPLE 5

Steel bead wires (d=0.96mm) were solent degreased and cleaned as in Example 1 and then dipped into an adhesive composition consisting of mixture of 1) a butadiene, 2-vinyl pyridine copolymer latex (composition 90:10, 12% resin solids) and 2) a 20% solids aqueous dispersion of silica (Syloid 244). The coated wires were dried at 170° C for 60 seconds and then vulcanized in an H-test mold at 155° C under 60 Kg/cm² pressure with the following compounded synthetic rubber formulations.

Table 5

| Butadiene Rubber | 100 | — | — |
|---|---|---|---|
| Styrene-Butadiene Rubber | — | 100 | — |
| Polyisoprene Rubber | — | — | 100 |
| MPC Black | 70 | — | — |
| ISAF Black | — | 28 | 70 |
| Hisil 233 | — | 42 | — |
| Zinc Oxide | 10 | 5 | 5 |
| Stearic Acid | — | 2 | 2 |
| Pine Tar | 4 | — | — |
| Phenyl β-Napthylamine | 1 | — | — |
| Cobalt Naphthenate | 5 | — | — |
| n-Oxydiethylene Benzothiazyl-2-Sulfenamide | — | 1.3 | 0.8 |
| Dibenzothiazyl Disulfide | 0.5 | — | — |
| Cyclohexyl-Benzothiazyl-Sulfenamide | 0.5 | — | — |
| Sulfur | 3.5 | 1.5 | 1.5 |
| Vulcanization (Minutes at 155° C) | 30 | 40 | 20 |
| H-test results (Kg/2cm) at 120° C | 47 | 52 | 35 |
| H-test results — control — (No silica in adhesive) | — | 29 | 7 |

EXAMPLE 6

Steel bead wires (d = 0.96 mm) were solvent degreased and cleaned as in Example 1, then dipped into an adhesive composition consisting of a mixture of 1) a butadiene, 2-vinyl pyridine copolymer latex (composition 90:10, 12% resin solids) and 2) a 20% solids aqueous dispersion of silica (Syloid 244, particle size 3 – 4 mμ. The coated wires were dried at 170° C for 60 seconds and then vulcanized in an H-Test mold at 135° C for 60 minutes under 60 Kg/cm² pressure with the following compounded rubber formulation. The ratio of silica to copolymer on a dry weight basis in the adhesive was 30/100.

| Formulation B | |
|---|---|
| Natural rubber No. 1 (Smoked Sheet) | 100 |
| HAF Carbon Black | 50 |
| Zinc oxide | 8 |
| Stearic acid | 1 |
| Pine tar | 3 |
| Sulfur | 5 |
| Phenyl $\alpha$-naphthlamine | 1 |
| Cobalt naphthenate | 2.5 |
| 2-Mercapto benzothiazole | 1.5 |

The samples were aged 24 hours after vulcanization and then ½ of the samples tested at room temperature and the other ½ heated to and tested at 120° C. (Test rate = 200 mm/min.)

The bond strengths were 48 Kg/2cm at 120° C and 67 Kg/2cm at room temperature.

EXAMPLE 7

Steel bead wires ($d = 0.96$ mm) were solvent degreased and cleaned as in Example 1, then dipped into an adhesive composition consisting of a mixture of 1) a butadiene-2-vinyl pyridine copolymer latex (12% resin solids) and 2) a 20% solids aqueous dispersion of silica (Syloid 244). The ratio of silica to copolymer on a dry weight basis in the adhesive was 48/100. The coated wires were dried at 170° C for 30 seconds and then vulcanized in a H-test mold at 135° C for 60 minutes under 60 Kg/cm² pressure. The results of the H-test with the various compositions of the copolymers are shown in the following table. The same experimental series was repeated with a compounded rubber whose formulation is the same as above except the cobalt naphthenate was not added.

Table 6

| | Control | 1 | 2 | 3 | 4 | 5 | control |
|---|---|---|---|---|---|---|---|
| wt % Butadiene | 100 | 99 | 95 | 90 | 85 | 80 | 70 |
| wt % 2-Vinyl pyridine | 0 | 1 | 5 | 10 | 15 | 20 | 30 |
| H-test results (Kg/2cm) at 120° C | 18 | 27 | 39 | 47 | 48 | 43 | 13 |
| " (without cobalt naphthenate) | 9 | 14 | 30 | 37 | 38 | 12 | 6 |

EXAMPLE 8

Example 7(3) was repeated except that a butadiene 2-methyl-5-vinyl pyridine copolymer latex (composition 90:10, 12% resin solids) was substituted for the butadiene, 2-vinylpyridine copolymer latex.

Table 7

| | Example |
|---|---|
| wt % butadiene | 90 |
| wt % 2-methyl-5-vinyl pyridine | 10 |
| H-test (Kg/2cm) at 120° C | 44 |
| H-test without cobalt naphthenate | 29 |

EXAMPLE 9

Steel bead wires ($d = 0.96$ mm) were solvent degreased and cleaned as in Example 1, and then dipped into one of the following adhesive compositions.

Control: a butadiene-2-vinyl pyridine copolymer (composition 90:10, 3 wt % resin solids in tetrahydrofuran)

Control: a butadiene-2-vinyl pyridine copolymer (composition 90:10) in tetrahydrofuran (THF) and a MPC carbon black were ball milled in tetrahydrofuran. Final composition was 3 wt % of polymer and 0.8 wt % MPC black in THF.

A butadiene-2-vinylpyridine copolymer (composition 90:10) in tetrahydrofuran and silica (Syloid 244) were ball milled in THF. Final composition was 3 wt % polymer and 0.9 wt % SiO₂ in THF.

In each example the coated wires were dried at 170° C for 60 seconds and then vulcanized in an H-test mold at 135° C for 60 minutes under 60 Kg/cm² pressure with the compounded rubber formulation B. The following results were obtained.

Table 8

| Experiment | Control | Control | Experiment |
|---|---|---|---|
| copolymer | 100 | 100 | 100 |
| MPC carbon black | — | 30 | — |
| Silica (Syloid 244) | — | — | 30 |
| H-test (Kg/2cm) at 120° C | 23 | 21 | 40 |

EXAMPLE 10

Steel bead wires ($d = 0.86$ mm) were solvent degreased and cleaned as in Example 1 and then dipped into an adhesive composition consisting of a mixture of (1) a butadiene, 2-vinyl pyridine copolymer latex (composition 90:10, 12% resin solids) and (2) a 20% solids aqueous dispersion of silica (Syloid 244).

The coated wires were dried at 170° C for 60 seconds and then vulcanized in an H-test mold at 135° C for 60 minutes under 60 Kg/cm² pressure with the compounded rubber formulation B.

The adhesive strength was evaluated while varying the silica content in the adhesive. The following results were obtained.

Table 9

| Experiment | Control | 1 | 2 | 3 | 4 | 5 | 6 | 7 | 8 | 9 | 10 | 11 | 12 |
|---|---|---|---|---|---|---|---|---|---|---|---|---|---|
| parts SiO₂/100 parts copolymer | 0 | 5 | 12 | 24 | 30 | 36 | 42 | 48 | 60 | 80 | 100 | 120 | 150 |
| H-test (kg/2cm) at 120° C | 10 | 26 | 28 | 43 | 45 | 48 | 50 | 54 | 47 | 49 | 54 | 46 | 40 |

EXAMPLE 11

Example 6 with the rubber formulation B was repeated with the following substitutions for the filler. In each case the filler to polymer ratio was maintained at a constant 30/100.

1. Snow Tex 20, pH 9.5–10.0, particle size 10–20 m$\mu$,
2. Snow Tex O, pH 3.0 –4.0, particle size 10–20 m$\mu$,
3. Hi-Sil 233, particle size 22 m$\mu$,
4. Syloid 65, particle size 4 m$\mu$,
5. Silnex NP-8, particle size 3 m$\mu$,
6. Aerosil 200, particle size 16 m$\mu$, SiO₂ content >99.8%.

control 1. MPC carbon black (added as a ball milled water dispersion
control 2. Bentonite, particle size 53 μ, Table 10

| Experiment | 1 | 2 | 3 | 4 | 5 | 6 | control 1 | control 2 |
|---|---|---|---|---|---|---|---|---|
| H-test results (Kg/2cm) at 120° C | 27 | 27 | 35 | 41 | 43 | 47 | 14 | 9 |

EXAMPLE 12

Steel bead wires ($d = 0.96$ mm) were solvent degreased and cleaned as in Example 1, then dipped into an adhesive composition consisting of a mixture of 1) a butadiene, 2-vinylpyridine latex (composition 85:15, 12% resin solids) and 2) a 20% solids aqueous dispersion of silica (Syloid 244). The coated wires were dried at 170° C for 60 seconds and then vulcanized in an H-test mold at 135° C for 60 minutes under 60 Kg/cm² pressure with the following compounded rubber formulations. The ratio of silica to copolymer on a dry weight basis in the adhesive was 30/100.

Table 11

| Experiments | Control | 1 | 2 | 3 | 4 | 5 | 6 | 7 |
|---|---|---|---|---|---|---|---|---|
| Natural Rubber No. 1 (Smoked Sheet) | 100 | 100 | 100 | 100 | 100 | 100 | 100 | 100 |
| HAF Black | 50 | 50 | 50 | 50 | 50 | 50 | 50 | 50 |
| Zinc Oxide | 8 | 8 | 8 | 8 | 8 | 8 | 8 | 8 |
| Stearic Acid | 1 | 1 | 1 | 1 | 1 | 1 | 1 | 1 |
| Pine Tar | 3 | 3 | 3 | 3 | 3 | 3 | 3 | 3 |
| Sulfur | 5 | 5 | 5 | 5 | 5 | 5 | 5 | 5 |
| Phenyl-β-Naphthyl-amine | 1 | 1 | 1 | 1 | 1 | 1 | 1 | 1 |
| 2-mercaptobenzothiazole | 1.5 | 1.5 | 1.5 | 1.5 | 1.5 | 1.5 | 1.5 | 1.5 |
| Cobalt Naphthenate | — | 0.25 | 0.5 | 1.0 | 2.0 | 2.5 | 3.0 | 5.0 |
| H-test (Kg/2cm) at 120° C | 33 | 37 | 40 | 43 | 45 | 48 | 45 | 44 |

EXAMPLE 13

Example 12(5) was repeated except that in place of the 2.5 parts of cobalt naphthenate were added 2.5 parts of cobalt stearate.

The bond strength at 120° C was 49 Kg/2cm.

EXAMPLE 14

Steel bead wires ($d = 0.96$ mm) were solvent degreased and then etched for 20 seconds at 55° C in 36% hydrochloric acid, rinsed in water and dipped into an adhesive composition consisting of a mixture of (1) a styrene, butadiene, 2-vinylpyridine terpolymer latex (composition 1:84:15, 12% resin solids and (2) a 20% solid aqueous dispersion of silica (Syloid 244, particle size 3-4mμ). The coated wires were dried at 120° C for 45 seconds and then vulcanized in an H-Test mold at 135° C for 45 minutes under 60 Kg/cm² pressure with the following compounded rubber formulation. The ratio of silica to terpolymer on a dry weight basis in the adhesive was 50/100.

TABLE VI

| | Sample | Den., pcf. | Compr. Str.,10% def.,psi | Tumb. Friab.% wt.loss | Butler Chimney %Wt.Ret. |
|---|---|---|---|---|---|
| A. One Shot | 4' | 2.1 | 20 | 59 | 75 |
| | 5' | 2.2 | 17 | 61 | 45 |
| B. Quasi-Prepolymer | 6' | 2.0 | 20 | 62 | 35 |
| | 4 | 1.8 | 21 | 39 | 90 |
| | 5 | 2.3 | 35 | 16 | 87 |
| | 6 | 2.0 | 26 | 14 | 84 |

The samples were aged 24 hours after vulcanization and then heated to and tested at 120° C (Test rate = 200 mm/min.). The bond strength was 67 Kg/2cm.

CONTROL EXAMPLE

Example 14 was repeated except the silica was omitted from the adhesive. The bond strength at 120° C was zero.

EXAMPLE 15

Steel bead wires were cleaned and etched as in Example 14 and then dipped into an adhesive composition consisting of a mixture of (1) a styrene, butadiene, 2-vinyl pyridine terpolymer latex (varying composition, 12% resin solids) and 2) a 20% solids aqueous dispersion of silica (Syloid 244). The ratio of silica to terpolymer on a dry weight basis in the adhesive was 50/100. The coated wires were dried at 120° C for 45 seconds and then vulcanized in an H-test mold at 135° C for 45 minutes under 60 Kg/cm² pressure with the compounded rubber Formulation C plus 2.5 parts of cobalt napthenate.

The results of the H-Test with various compositions of the terpolymers are shown in the following table.

Table 12

| | Control | 1 | 2 | 3 | 4 | 5 | 6 | 7 | 8 | 9 | 10 | 11 | 12 |
|---|---|---|---|---|---|---|---|---|---|---|---|---|---|
| wt % Styrene | 1 | 1 | 1 | 1 | 1 | 1 | 1 | 1 | 5 | 15 | 35 | 45 | 15 |
| wt % Butadiene | 99 | 98 | 94 | 84 | 79 | 74 | 69 | 54 | 80 | 70 | 50 | 40 | 60 |
| wt % 2-Vinyl pyridine | — | 1 | 5 | 15 | 20 | 25 | 30 | 45 | 15 | 15 | 15 | 15 | 25 |
| H-Test Results (Kg/2cm) at 120° C | 11 | 46 | 64 | 70 | 65 | 61 | 54 | 39 | 71 | 56 | 51 | 51 | 49 |

EXAMPLE 16

Example 1 was repeated with the following changes in the terpolymer composition.

Table 13

|  | 1 | 2 | 3 | 4 | 5 |
|---|---|---|---|---|---|
| Butadiene | 80 | — | 80 | 80 | 74 |
| Isoprene | — | 80 | — | — | — |
| Styrene | — | 5 | 5 | — | 16 |
| Methyl methacrylate | 5 | — | — | — | — |
| Acrylonitrile | — | — | — | 5 | — |
| 2-vinyl pyridine | 15 | 15 | — | 15 | — |
| 4-vinyl pyridine | — | — | 15 | — | — |
| 2-methyl-5-vinyl pyridine | — | — | — | — | 10 |
| H-test (Kg/2cm) at 120° C | 36 | 24 | 38 | 33 | 36 |

CONTROL EXAMPLE

To further demonstrate the uniqueness of the combination of silica with the terpolymers containing butadiene and vinyl pyridine, attempts were made to bond the rubber formulation of Example 14 to steel using a natural rubber latex and a styrene butadiene latex with and without the added silica (50 parts $SiO_2$/100 parts of latex solids).

SBR latex: composition ratio, styrene/butadiene = 25/75, 12% solids,

Natural Rubber Latex: 12% solids,

The results were as follows.

Table 14

| Latex Composition | SBR | SBR + Silica | Natural Rubber | Natural rubber + silica |
|---|---|---|---|---|
| H-Test (Kg/2cm) at 120° C | <5 | <5 | <5 | <5 |

EXAMPLE 17

Steel bead wires were cleaned and etched as in Example 14 and then dipped into an adhesive composition consisting of a mixture of (1) a styrene, butadiene, 2-vinyl pyridine terpolymer (composition 1:84:15, 2% resin solids) and (2) a 20% aqueous dispersion of silica (Syloid 244). The coated wires were dried at 120° C for 45 seconds and then vulcanized in an H-Test mold at 135° C for 45 minutes under 60 Kg/cm² pressure with the compounded rubber Formulation C. The adhesive strength was evaluated as a function of the silica content in the adhesive.

Table 15

|  | Control | 1 | 2 | 3 | 4 | 5 | 6 | 7 | 8 | 9 | 10 | 11 |
|---|---|---|---|---|---|---|---|---|---|---|---|---|
| Parts $SiO_2$/100 parts of terpolymer | 0 | 5 | 10 | 20 | 30 | 40 | 50 | 70 | 90 | 120 | 150 | 180 |
| H-Test (Kg/2cm) at 120° C | 0 | 28 | 46 | 57 | 58 | 61 | 73 | 72 | 62 | 61 | 56 | 49 |

EXAMPLE 18

Steel bead wires were cleaned and etched as in Example 14 and then dipped into one of the following adhesive compositions.

Control 1: a styrene, butadiene, 2-vinyl pyridine terpolymer (composition 15:70:15, 5 wt% resin solids in tetrahydrofuran).

Control 2: a styrene, butadiene, 2-vinyl pyridine terpolymer (composition 15:70:15) in tetrahydrofuran and an MPC carbon black were ball milled in tetrahydrofuran. Final composition was 3.33 wt % of polymer and 1.67 wt % of carbon black in THF.

Experiment: a styrene, butadiene, 2-vinyl pyridine terpolymer (composition 15:70:15) in tetrahydrofuran and silica (Syloid 244) were ball milled in tetrahydrofuran. Final composition was 3.33 wt % of polymer and 1.67 wt % of silica in THF.

In each example the coated bead wires were dried at 120° C for 45 secs. and then vulcanized in an H-Test mold at 135° C for 45 minutes under 60 Kg/cm² as in Example 14.

Table 16

| Experiment | Control 1 | Control 2 | Experiment |
|---|---|---|---|
| Terpolymer | 100 | 100 | 100 |
| MPC Black | — | 50 | — |
| Silica | — | — | 50 |
| H-Test (Kg/2cm) at 120° C | 18 | 23 | 48 |

EXAMPLE 19

Steel bead wires were cleaned and etched as in Example 14 and then dipped into an adhesive composition consisting of a mixture of (1) a styrene, butadiene, 2-vinyl pyridine terpolymer latex (composition 5:80:15, 12% resin solids and (2) one of the following fillers (20% aqueous dispersions).

The coated wires were dried at 120° C for 45 seconds and then vulcanized in an H-Test mold as usual with the compounded rubber Formulation C. The results show that only the high silica content fillers are effective in improving the bond strengths of these adhesive terpolymers. The ratio of filler to terpolymer on a dry weight basis was 50/100.

1. Hi-Sil 233, particle size 22 mµ,
2. Snow Tex 0, pH 3.0~4.0, particle size 10 – 20 mµ.

Control No. 1 Bentonite, particle size 53 µ,

Control No. 2 MPC carbon black (ball milled in water).

Table 17

| Expt. |  | Filler | H-Test (Kg/2cm) at 120° C |
|---|---|---|---|
| 1 |  | Hi Sil 233 | 37 |
| 2 |  | Snow Tex 0 | 41 |
| Control 1 |  | Bentonite | 13 |
| Control 2 |  | MPC | 19 |

EXAMPLE 20

Steel bead wires were cleaned and etched as in Example 14 and then dipped into an adhesive composition consisting of a mixture of (1) a styrene, butadiene, 2-vinyl pyridine terpolymer latex (composition 1:84:15, 12% resin solids) and (2) a 20% solids aqueous dispersion of silica (Syloid 244). The ratio of silica to terpolymer on a dry weight basis in the adhesive was 50/100. The coated wires were dried at 120° C for 45 seconds and then vulcanized in a H-Test mold with the following compounded synthetic rubber formulations, and the following results.

Table 18

|  | 1 | 2 | 3 |
|---|---|---|---|
| Polybutadiene | 100 | — | — |
| Polyisoprene | — | 100 | — |
| Styrene-butadiene rubber (25/75) | — | — | 100 |
| ISAF Black | 70 | — | 35 |
| MPC Black | — | 50 | — |
| Silica | — | — | 35 |
| Zinc Oxide | 5 | 10 | 5 |
| Stearic Acid | 2 | — | 2 |
| Pine Tar | — | 4 | — |
| Sulfur | 1.5 | 3.5 | 1.5 |
| 2,2'-Dithio-bis-benzothiazole | — | 0.5 | — |
| N-Cyclohexyl-2-benzothiazole sulfenamide | — | 0.5 | — |
| N-Oxydiethylene-2-benzothiazole sulfenamide | 1 | — | 1.3 |
| Phenyl β-Naphthylamine | — | 1 | — |
| Vulcanization Conditions |  |  |  |
| Time (mins)/Temp. | 40/155° C | 20/145° C | 50/145° C |
| H-Test (Kg/2cm) at 120° C (NO $SiO_2$) | 3 | 5 | 4 |
| H-Test (Kg/2cm) at 120° C (with $SiO_2$) | 20 | 53 | 25 |

EXAMPLE 21

Steel bead wires ($d$ = 0.96 mm) were solvent degreased, etched for 20 seconds in concentrated hydrochloric acid at 55° C, rinsed in water then dipped into an adhesive composition consisting of a mixture of (1) a styrene, butadiene, 2-vinylpyridine terpolymer latex (composition 1:84:15, 12% resin solids) and (2) a 20% solids aqueous dispersion of silica (Syloid 244, particle size 3-4 mμ. The coated wires were dried at 120° C for 45 seconds and then vulcanized in an H-test mold at 135° C for 45 minutes under 60 Kg/cm² pressure with the following compounded rubber formulation. The ratio of silica to terpolymer on a dry weight basis in the adhesive was 50/100.

| Formulation D |  |
|---|---|
| Natural Rubber No. 1 (smoked sheet) | 100 |
| HAF Carbon Black | 50 |
| Zinc Oxide | 8 |
| Stearic Acid | 1 |
| Pine Tar | 3 |
| Sulfur | 5 |
| Phenyl β-Naphthylamine | 1 |
| Cobalt napthenate | 2.5 |
| 2 - Mercaptobenzothiazole | 1.5 |

The samples were aged 24 hours after vulcanization and heated to and tested at 120° C (Test rate = 200 mm/min).

The bond strength was 70 Kg/2cm.

EXAMPLE 22

Example 21 was repeated except that the following latices were substituted for the styrene, butadiene, 2-Vinyl pyridine latex Table 19

|  | 1 | 2 | 3 | 4 | 5 |
|---|---|---|---|---|---|
| wt % Styrene | — | 5 | 5 | — | 16 |
| wt % Methyl Methacrylate | 5 | — | — | — | — |
| wt % Acrylonitrile | — | — | — | 5 | — |
| wt % Butadiene | 80 | — | 80 | 80 | 74 |
| wt % Isoprene | — | 80 | — | — | — |
| wt % 2-Vinyl pyridine | 15 | 15 | — | 15 | — |
| wt % 4-Vinyl pyridine | — | — | 15 | — | — |

Table 19-continued

|  | 1 | 2 | 3 | 4 | 5 |
|---|---|---|---|---|---|
| 2-Methyl-5-vinyl pyridine | — | — | — | — | 10 |
| H-Test Results (Kg/2cm at 120° C) | 50 | 44 | 45 | 65 | 46 |

EXAMPLE 23

Steel bead wires were cleaned and etched as in Example 21 and then dipped into one of the following adhesive compositions.

Control 1: a styrene, butadiene, 2-vinyl pyridine terpolymer (composition 15:70:15, 5 wt % resin solids in tetrahydrofuran).

Control 2: a styrene, butadiene, 2-vinyl pyridine terpolymer (composition 15:70:15) in tetrahydrofuran and an MPC carbon black were ball milled in tetrahydrofuran. Final composition was 3.33 wt % of polymer and 1.67 wt % of carbon black in THF.

Experiment: a styrene, butadiene, 2-vinyl pyridine terpolymer (composition 15:70:15) in tetrahydrofuran and silica (Syloid 244) were ball milled in THF. Final composition was 3.33 wt % of polymer and 1.67 wt % of silica in THF.

In each case the coated bead wires were dried at 170° C for 60 seconds and then vulcanized in an H-Test mold at 135° C for 45 minutes under 60 Kg/cm² pressure with the compounded rubber Formulation D. The results were as follows.

Table 20

| Experiment | Control | Control | Experiment |
|---|---|---|---|
| Terpolymer | 100 | 100 | 100 |
| MPC Black | — | 50 | — |
| Silica | — | — | 50 |
| H-Test (Kg/2cm) at 120° C | 12 | 18 | 39 |

EXAMPLE 24

Steel bead wires ($d$ = 0.96 mm) were cleaned and etched as in Example 21 and then dipped into an adhesive composition consisting of a mixture of (1) a styrene, butadiene, 2-vinyl pyridine terpolymer latex (composition 1:84:15, 12% resin solids) and (2) a 20% solids aqueous dispersion of silica (Syloid 244). The coated wires were dried at 120° C for 45 seconds and then vulcanized in an H-test mold at 135° C for 45 minutes under 60 Kg/cm² pressure with the compounded rubber Formulation D. The adhesive strength was evaluated while varying the silica content in the adhesive.

latex solids). The coated wires were dried at 170° C for 1 minute and vulcanized in an H-Test mold as usual.

SBR Latex: composition ratio, styrene/butadiene = 25/75, 12% solids

Natural Rubber Latex: 12% solids

Table 21

| No. of Experiment | Control | 1 | 2 | 3 | 4 | 5 | 6 | 7 | 8 | 9 | 10 | 11 |
|---|---|---|---|---|---|---|---|---|---|---|---|---|
| Parts SiO₂/100 parts terpolymer | 0 | 5 | 10 | 20 | 30 | 40 | 50 | 70 | 90 | 120 | 150 | 180 |
| H-Test Kg/2cm at 120° C | 35 | 54 | 58 | 59 | 65 | 69 | 74 | 69 | 58 | 62 | 58 | 46 |

EXAMPLE 25

Steel bead wires (d = 0.96 mm) were cleaned and etched as in Example 21 and then dipped into an adhesive composition consisting of a mixture of (1) a styrene, butadiene, 2-vinyl pyridine terpolymer latex (composition 5:80:15, 12% resin solids) and (2) a 20% solids aqueous dispersion of the following fillers. In each case the filler to polymer ratio was maintained at a constant 50/100. The coated wires were dried at 120° C for 45 secs. and then vulcanized in an H-Test mold using the same compounded rubber and conditions of example 21. The results show that only the high silica content fillers are effective in improving the bond strengths of these adhesive terpolymers.

1. Hi-Sil 233, particle size 22 mµ,
2. Snow Tex 0, pH 3.0~4.0, particle size 10~20 mµ, Control 1: Bentonite, particle size 53µ
Control 2: MPC carbon black (ball milled in water)
Control 3: No filler Table 22

| Expt. | Filler | H-Test (Kg/2cm at 120° C) |
|---|---|---|
| 1 | Hi-Sil 233 | 50 |
| 2 | Snow Tex 0 | 65 |
| Control 1 | Bentonite | 26 |
| Control 2 | MPC Black | 33 |
| Control 3 | None | 30 |

EXAMPLE 26

To further demonstrate the uniqueness of the combination of silica with terpolymers containing butadiene and vinyl pyridine, attempts were made to bond the rubber formulation of Example 21 to steel using a natural rubber latex and a styrene butadiene latex with and without the added silica (50 parts SiO₂/100 parts of Table 23

| Adhesive | H-Test (Kg/2cm) at 120° C |
|---|---|
| SBR Latex | 5 |
| SBR Latex & Syloid 244 | 13 |
| Natural Rubber Latex | 12 |
| Natural Rubber Latex & Syloid 244 | 10 |
| Vinyl pyridine Terpolymer Latex (15:70:15) | 28 |
| Vinyl pyridine Terpolymer Latex & Syloid 244 | 50 |

EXAMPLE 27

To demonstrate the ability of these adhesives to bond also to synthetic rubbers, Example 21 was repeated with following changes in the rubber to be bonded.

Table 24

| Rubber Formulation | 1 | 2 | 3 |
|---|---|---|---|
| Polybutadiene | 100 | — | — |
| Polyisoprene | — | 100 | — |
| SBR (Styrene/Butadiene 25/75) | — | — | 100 |
| ISAF Black | 70 | — | 35 |
| MPC Black | — | 50 | — |
| Silica (Hi-Sil 233) | — | — | 35 |
| Zinc Oxide | 5 | 10 | 5 |
| Stearic Acid | 2 | — | 2 |
| Pine Tar | — | 4 | — |
| Sulfur | 1.5 | 3.5 | 1.5 |
| 2,2'-Dithio-bis-benzothiazole | — | 0.5 | — |
| N-Cyclohexyl-2-benzothiazole sulfenamide | — | 0.5 | — |
| N-Oxydiethylene-2-benzothiazole sulfenamide | 1 | — | 1.3 |
| Phenyl β-Naphthylamine | — | 1 | — |
| Cobalt Naphthenate | 5 | 2.6 | 2.6 |
| Vulcanization Conditions Time (mins)/Temp. | 40/155° | 20/145° | 50/145° |
| H-Test (Kg/2cm) at 120° C (No SiO₂) | 27 | 10 | 12 |
| H-Test (Kg/2cm) at 120° C (with SiO₂) | 49 | 65 | 64 |

As many possible embodiments may be made of this invention without departing from the scope thereof, it is to be understood that all matter herein set forth is to be interpreted as illustrative and not as unduly limiting the invention.

What is claimed is:

1. In a process of bonding a rubber to a ferrous metal substrate wherein an adhesive is applied to said metal substrate and the rubber is contacted therewith and bonded by heat and pressure, the improvement comprising using as said adhesive an interpolymer comprising about 40–99 percent by weight of a conjugated diene, about 1–20 percent by weight of a heterocyclic nitrogen base and 0 to about 40 percent by weight of at least one additional copolymerizable monomer, said adhesive containing about 5–180 parts of a high purity silica filler per 100 parts of said interpolymer.

2. The process of claim 1 wherein said conjugated diene is a hydrocarbon containing 4 to 8 carbon atoms, a halogen-substituted hydrocarbon containing 4 to 8 carbon atoms or a lower alkoxy-substituted hydrocarbon containing 4 to 8 carbon atoms.

3. A process according to claim 1 wherein said heterocyclic nitrogen base has the formula

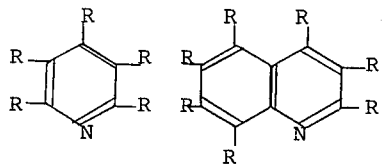 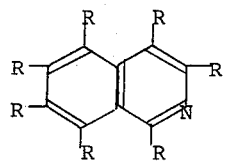

or wherein R is selected from the group consisting of hydrogen, alkyl, vinyl, alpha-methylvinyl, alkoxy, halo, hydroxy, cyano, aryloxy, aryl, halo-alkyl, hydroxy alkyl, alkoxy-alkyl, cyano-alkyl, halo aryl, alkoxy aryl, hydroxy aryl, cyano aryl, and alkyl aryl, one of said R's having the formula $CH_2=C<$ and the total number of carbon atoms in each R substituent being not greater than 15.

4. A process according to claim 1 wherein said heterocyclic nitrogen base is selected from the group consisting of 2-vinyl pyridine; 2-vinyl-5-ethylpyridine; 2-methyl-5-vinylpyridine; 4-vinyl pyridine; 2,3,4-trimethyl-5-vinylpyridine; 3,4,5,6 tetramethyl-2-vinylpyridine; 3-ethyl-5-vinylpyridine; 2,6-diethyl-4-vinylpyridine; 2-isopropyl-4-nonyl-5-vinylpyridine; 2-methyl-5-undecyl-3-vinylpyridine; 2-decyl-5-(alpha-methylvinyl)pyridine; 2-vinyl-3-methyl-5-ethyl-pyridine; 2-methoxy-4-chloro-6-vinyl-pyridine; 3-vinyl-5-ethoxypyridine; 2-vinyl-4,5-dibromopyridine; 2-vinyl-4-chloro-5-bromopyridine; 2(alpha-methylvinyl)-4-hydroxy-6-cyanopyridine; 2-vinyl-4-phenoxy-5-methylpyridine; 2-cyano-5-(alpha-methylvinyl)pyridine; 3-vinyl-5-phenyl pyridine; 2-(paramethylphenyl)-3-vinyl-4-methylpyridine; 3-vinyl-5-(hydroxyphenyl)-pyridine; 2-vinylquinoline; 2-vinyl-4-ethylquinoline; 3-vinyl-6,7-di-n-propyl quinoline; 2-methyl-4-nonyl-6-vinylquinoline; 4(alpha-methylvinyl)-8-dodecyl quinoline; 3-vinylisoquinoline; 1,6-dimethyl-3-vinylisoquinoline; 2-vinyl-4-benzyl-quinoline; 3-vinyl-5-chloroethyl-quinoline; 3-vinyl-5,6-dichloroisoquinoline; 2-vinyl-6-ethoxy-7-methylquinoline and 3-vinyl-6-hydroxymethylisoquinoline.

5. A process according to claim 1 wherein said rubber is selected from the group consisting of natural rubber, polybutadiene, polyisoprene, copolymers of butadiene with styrene, copolymers of butadiene with acrylonitrile, and polychloroprene.

6. A process according to claim 1 wherein said interpolymer is a copolymer of butadiene and 2-vinyl pyridine.

7. A process according to claim 1 wherein said additional monomer is an organic compound containing at least one polymerizable ethylenic group.

8. A process according to claim 1 wherein said additional monomer is selected from the group consisting of styrene, 3-phenyl-3-butene-1-ol, p-chlorostyrene, p-methoxystyrene, alpha-methyl styrene, vinyl naphthalene, methyl acrylate, ethyl acrylate, methyl methacrylate, ethyl methacrylate, butyl methacrylate, methyl ethacrylate, acrylonitrile, methacrylonitrile, methacrylamide, methyl isopropyl ketone, methyl vinyl ketone, methyl vinyl ether, vinyl acetate, vinyl chloride, vinylidene chloride, vinyl furane, vinyl carbazole, and vinyl acetylene.

9. A process according to claim 1 wherein said interpolymer is a terpolymer of styrene, butadiene and 2-vinyl pyridine.

10. A process according to claim 1 wherein said interpolymer is a terpolymer of 2-vinyl pyridine, isoprene and styrene.

11. A process according to claim 1 wherein said interpolymer is a terpolymer of 4-vinyl pyridine, butadiene and styrene.

12. A process according to claim 1 wherein said interpolymer is a terpolymer of 2-methyl-5-vinyl pyridine, butadiene and styrene.

13. A laminated article comprising a ferrous metal substrate having bonded thereto a rubber by means of an adhesive layer, said adhesive being an interpolymer comprising about 40–99 percent by weight of a conjugated diene, about 1–20 percent by weight of a heterocyclic nitrogen base and 0 to about 40 percent by weight of at least one additional copolymerizable monomer, and said adhesive containing about 5–180 parts of a high purity silica filler per 100 parts of said interpolymer on an anhydrous weight basis.

14. A laminated article according to claim 13 wherein, said conjugated diene is a hydrocarbon containing 4 to 8 carbon atoms, a halogen-substituted hydrocarbon containing 4 to 8 carbon atoms or a lower alkoxy-substituted hydrocarbon containing 4 to 8 carbon atoms.

15. A laminated article according to claim 13 wherein, said heterocyclic nitrogen base has the formula

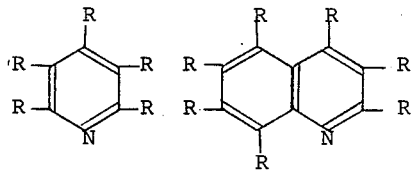 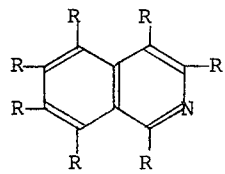

or wherein R is selected from the group consisting of hydrogen, alkyl, vinyl, alpha-methylvinyl, alkoxy, halo, hydroxy, cyano, aryloxy, aryl, halo-alkyl, hydroxy alkyl, alkoxy-alkyl, cyano-alkyl, halo aryl, alkoxy aryl, hydroxy aryl, cyano aryl, and alkyl aryl, one of said R's having the formula $CH_2=C<$ and the total number of carbon atoms in each R substituent being not greater than 15.

16. A laminated article according to claim 13 wherein, said heterocyclic nitrogen base is selected from the group consisting of 2-vinyl pyridine; 2-vinyl-5- ethylpyridine; 2-methyl-5-vinylpyridine; 4-vinyl pyridine; 2,3,4-trimethyl-5-vinylpyridine; 3,4,5,6 tetramethyl-2-vinylpyridine; 3-ethyl-5-vinylpyridine; 2,6-diethyl-4-vinylpyridine; 2-isopropyl-4-nonyl-5-vinylpyridine; 2-methyl-5-undecyl-3-vinylpyridine; 2-decyl-5-(alpha-methylvinyl)pyridine; 2-vinyl-3-methyl-5-ethyl-pyridine; 2-methoxy-4-chloro-6-vinyl-pyridine; 3-vinyl-5-ethoxypyridine; 2-vinyl-4,5-dibromopyridine; 2-vinyl-4-chloro-5-bromopyridine; 2(alpha-methylvinyl)-4-hydroxy-6-cyanopyridine; 2-vinyl-4-phenoxy-5-methylpyridine; 2-cyano-5-(alpha-methylvinyl)pyridine; 3-vinyl-5-phenyl pyridine; 2-(paramethylphenyl)-3-vinyl-4-methylpyridine; 3-vinyl-5-(hydroxyphenyl)-pyridine; 2-vinylquinoline; 2-vinyl-4-ethylquinoline; 3-vinyl-6,7-di-n-propyl quinoline; 2-methyl-4-nonyl-6-vinylquinoline; 4(alpha-methylvinyl)-8-dodecyl quinoline; 3-vinylisoquinoline; 1,6-dimethyl-3-vinylisoquinoline; 2-vinyl-4-benzyl-quinoline; 3-vinyl-5-chloroethylquinoline; 3-vinyl-5,6-dichloroisoquinoline; 2-vinyl-6-ethoxy-7-methylquinoline and 3-vinyl-6-hydroxymethylisoquinoline.

17. A laminated article according to claim 13 wherein, said rubber is selected from the group consisting of natural rubber, polybutadiene, polyisoprene, copolymers of butadiene with styrene, copolymers of butadiene with acrylonitrile, and polychloroprene.

18. A laminated article according to claim 13 wherein, said interpolymer is a copolymer of butadiene and 2-vinyl pyridine.

19. A laminated article according to claim 13 wherein, said additional monomer is an organic compound containing at least one polymerizable ethylenic group.

20. A laminated article according to claim 13 wherein, said added monomer is selected from the group consisting of styrene, 3-phenyl-3-butene-1-ol, p-chlorostyrene, p-methoxystyrene, alpha-methyl styrene, vinyl naphthalene, methyl acrylate, ethyl acrylate, methyl methacrylate, ethyl methacrylate, butyl methacrylate, methyl ethacrylate, acrylonitrile, methacrylonitrile, methacrylamide, methyl isopropyl ketone, methyl vinyl ketone, methyl vinyl ether, vinyl acetate, vinyl chloride, vinylidene chloride, vinyl furane, vinyl carbazole, and vinyl acetylene.

21. A laminated article according to claim 13 wherein, said interpolymer is a terpolymer of styrene, butadiene and 2-vinyl pyridine.

22. A laminated article according to claim 13 wherein, said interpolymer is a terpolymer of 2-vinyl pyridine, isoprene and styrene.

23. A laminated article according to claim 13 wherein, said interpolymer is a terpolymer of 4-vinyl pyridine, butadiene and styrene.

24. A laminated article according to claim 13 wherein, said interpolymer is a terpolymer of 2-methyl-5-vinyl pyridine, butadiene and styrene.

25. A process according to claim 1 wherein said rubber contains about 0.025 to about 1.0 parts by weight of a cobalt compound, calculated as cobalt metal, per 100 parts of rubber.

26. A laminated article according to claim 13 wherein said rubber contains about 0.025 to about 1.0 parts by weight of a cobalt compound, calculated as cobalt metal, per 100 parts of rubber.

27. In a process of bonding a rubber to a ferrous metal substrate wherein an adhesive is applied to said metal substrate and the rubber is contacted therewith and bonded by heat and pressure, the improvement comprising using an adhesive consisting essentially of an interpolymer comprising about 40–99 percent by weight of a conjugated diene, about 1–20 percent by weight of a heterocyclic nitrogen base and 0 to about 40 percent by weight of at least one additional copolymerizable monomer, and about 5–180 parts of a high purity silica filler per 100 parts of said interpolymer.

28. A laminated article comprising a ferrous metal substrate having bonded thereto a rubber by means of an adhesive layer, said adhesive consisting essentially of an interpolymer comprising about 40–99 percent by weight of a conjugated diene, about 1–20 percent by weight of a heterocyclic nitrogen base and 0 to about 40 percent by weight of at least one additional copolymerizable monomer, and about 5–180 parts of a high purity silica filler per 100 parts of said interpolymer of an anhydrous weight basis.

* * * * *

UNITED STATES PATENT AND TRADEMARK OFFICE
CERTIFICATE OF CORRECTION

PATENT NO. : 3,993,847
DATED : November 23, 1976
INVENTOR(S) : Eiji Kondo

It is certified that error appears in the above-identified patent and that said Letters Patent are hereby corrected as shown below:

IN THE SPECIFICATION:

1) Column 3, line 18 after "addition", delete ",".
2) Column 3, line 19 after "blended", delete ",".
3) Column 5, lines 12, 13, and 15, change "hetrocyclic" to --heterocyclic--.
4) Column 7, line 53, change "examples" to --example--.
5) Column 10, line 19, change "solent" to --solvent--.
6) Column 14, delete TABLE VI and insert the following:

FORMULATION C

| | |
|---|---|
| Natural Rubber No. 1 (Smoked Sheet) | 100 |
| HAF Black | 50 |
| Zinc Oxide | 8 |
| Stearic Acid | 1 |
| Sulfur | 5 |
| 2-Mercapto benzothiazole | 1.5 |
| Pine Tar | 3 |
| Phenyl β-Naphthylamine | 1 |

7) Column 15, line 38, change "2%" to --12%--.
8) Column 16, line 22, change "solids" to --solids)--.

Signed and Sealed this

Nineteenth Day of April 1977

[SEAL]

Attest:

RUTH C. MASON
Attesting Officer

C. MARSHALL DANN
Commissioner of Patents and Trademarks